Jan. 7, 1969  T. J. HENNIGAN  3,419,964
APPARATUS FOR MEASURING SWELLING CHARACTERISTICS OF MEMBRANES
Filed Aug. 9, 1965

Thomas J. Hennigan
INVENTOR

United States Patent Office 3,419,964
Patented Jan. 7, 1969

3,419,964
APPARATUS FOR MEASURING SWELLING
CHARACTERISTICS OF MEMBRANES
Thomas J. Hennigan, West Hyattsville, Md., assignor to the United States of America as represented by the Administrator of the National Aeronautics and Space Administration
Filed Aug. 9, 1965, Ser. No. 478,491
U.S. Cl. 33—174                                   11 Claims
Int. Cl. G01b *3/00;* G01b *3/18*

ABSTRACT OF THE DISCLOSURE

A structure for measuring the expansion of a dry electrode-membrane battery assembly when subjected to and immersed in an electrolyte includes a chamber of two compartments separated by a flexible elastomeric membrane, the first compartment for retaining the assembly to be measured on a stationary member and the second compartment containing a movable pressure plate and a resilient member attached thereto for maintaining contact by the pressure plate against the sample which is in turn located on the base member. A micrometer probe is positioned such that it engages the surface of the pressure plate and measures its displacement.

---

The invention described herein may be manufactured and used by or for the Government of the United States of America for governmental purposes without the payment of any royalties thereon or therefor.

This invention relates to an apparatus for measuring the change in dimension of an object and more specifically to a method and apparatus for measuring the amount of swelling or expansion of polymer membranes employed as separators in electrochemical cells. The polymer membranes separating the plates of a cell are usually supplied in the dry state and when the cell is filled with an appropriate aqueous solution, the membranes expand so that they become a porous structure and exert a force against the cell walls.

As set forth, electrochemical cells or batteries are usually supplied in their dry state and an appropriate electrolyte must be added to the cell before use. Examples of such cells are the familiar alkaline electrochemical cells of silver-oxide zinc, silver-oxide cadmium, and nickel-oxide cadmium. In many applications, the change in dimension of the polymeric membrane electrode separators due to expansion upon immersion in the electrolyte, must be known. The membranes normally employed in the cells are non-porous in the dry state. When immersed in aqueous solutions, for example, potassium hydroxide, the membranes expand and become porous. Such a porous structure is required to provide ionic transport through the membrane and electrolyte retention. In the design of the cell cases, it is a requirement that the amount of subsequent expansion be known so that the dimensions of the cell case can be determined. With such information available, the cell case can be designed so that the electrode stack exerts a force within a predetermined range upon the case wall.

If the internal case dimensions are too great, the electrode stack will be loose within the cell case resulting in a high impedance battery. In addition, movement of the electrode assembly within the case during shock and vibration could cause breakage of cell components and separation of the wiring. On the other hand, if the cell case is too small, the expansion of the polymer separators will exert too large a force upon the cell case walls which results in either a bulge or break in the case or an electrode stack that is so compressed that the electrolyte is forced out of the polymer, thus producing a high impedance cell.

The device of the present invention permits an accurate determination and measurement of a complete electrode separator assembly during simulated conditions of the cell fabrication and operation. It provides the cell designer with an accurate, universal tool for determining the dimensions of cell cases which are to contain electrochemical cells with polymeric membrane separators that vary in thickness when immersed in an electrolyte.

Prior to the present invention, no known successful means was available for measuring the expansion of an object, such as a membrane-electrode assembly. It was a common practice to measure the thickness of a sample of the dry polymeric membrane material with a micrometer. The sample was then soaked in the electrolytic solution for a reasonable period of time, such as 24 hours. The sample was then removed from the electrolyte and blotted with an electrolytic absorber such as a paper towel. Thereafter, the thickness of the sample was measured at several points with the micrometer and the expansion of the material was determined by a comparison of the measurement before wetting with the measurement after immersion.

This practice as employed in the prior art, was unsatisfactory for a number of reasons. The use of a micrometer does not permit an accurate determination of the pressure applied on or by the sample of material before or as a result of expansion. Further, it was the normal practice to measure only a few points on the sample of material to determine the expansion and the same points measured before expansion were rarely measured after expansion. Since the expansion of the material may not be uniform over the entire surface, errors may result. In addition, it was the general practice of wetting the membrane sample by suspending the sample in a beaker of the electrolyte. By this means, no restraining force was applied so that the test and measurements could not simulate actual operating conditions. As a practical matter, an electrochemical cell may have as many as 100 layers of separator material in the electrode assembly. Measurement errors can therefore be accumulative and result in gross errors. Under these conditions, it was practically impossible to determine the proper cell size so that inferior cells were produced which were subject to case breakage, electrolyte spilling, and a change in the electrical parameters of the cell.

Accordingly, it is the principal object of the present invention to improve methods and apparatus for measuring the expansion of objects, such as electrode assemblies.

It is a further object of the present invention to provide a method and apparatus for simulating electrochemical cell conditions to accurately measure the force exerted by an electrode assembly on the cell case.

It is a further object of the present invention to provide an apparatus for accurately measuring the expansion of an object subjected to immersion, such as an electrode-membrane assembly.

It is a further object of the present invention to provide an apparatus for accurately measuring the expansion of an electrode-membrane assembly immersed in an electrolyte to thereby compile data for determining electrochemical cell case configurations.

It is a still further object of the present invention to provide an apparatus for determining the electrical characteristics of an electrochemical cell wherein known forces are employed to urge the electrode-membrane assemblies into compression.

These and other objects of the present invention are accomplished by providing a chamber having an open end. One side of the chamber is provided with a flat base plate while the opposite side of the chamber houses a micrometer having its measuring probe extending into the chamber. A substantially flat pressure plate is supported by a plurality of springs having a known spring constant, in spatial relation to the base plate. A diaphragm of an elastomeric material bisects the pressure plate so that a smaller inner chamber is formed in the area near the base plate and the pressure plate. A dry electrode-membrane assembly is placed between the pressure plate in the apparatus and the micrometer is adjusted to obtain a zero reading of the thickness of the membrane-electrode assembly and the spring compression. Thereafter, the compartment in the area housing the dry membrane-electrode assembly is filled with an electrolytic solution which immerses the membrane-electrode. The apparatus is then placed in a vacuum chamber and the pressure reduced to approximately five inches of mercury. This operation releases any entrapped air so that the membrane-electrode assembly can be completely wetted. Thereafter, the apparatus is brought up to atmospheric pressure and after reaching equilibrium (after 24 hours) the micrometer reading will give a measure of the expansion or swelling of the membrane and the compression of the springs. The force exerted by the membrane assembly is computed from the micrometer readings and the value of the spring constant.

The invention both as to its organization and method of operation, together with further objects and advantages thereof will best be understood by reference to the following specification taken in conjunction with the accompanying drawings in which.

Figure 1:
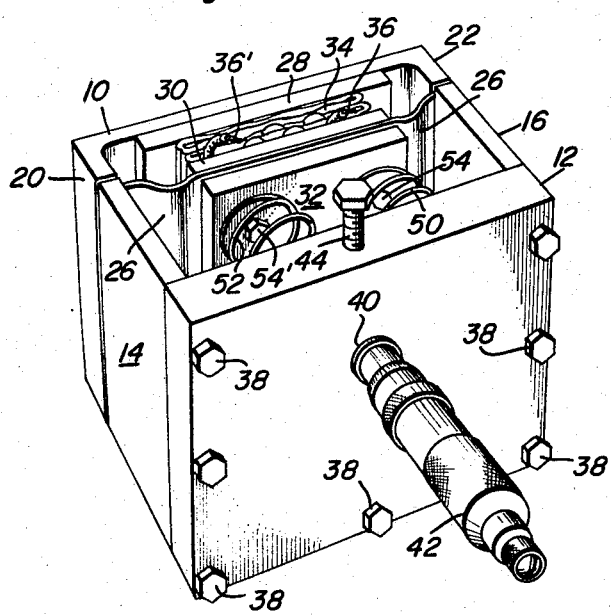
FIGURE 1 is a perspective view of the invention and illustrating the position of the assembly prior to immersing the electrode-membrane assembly.
Figure 2:
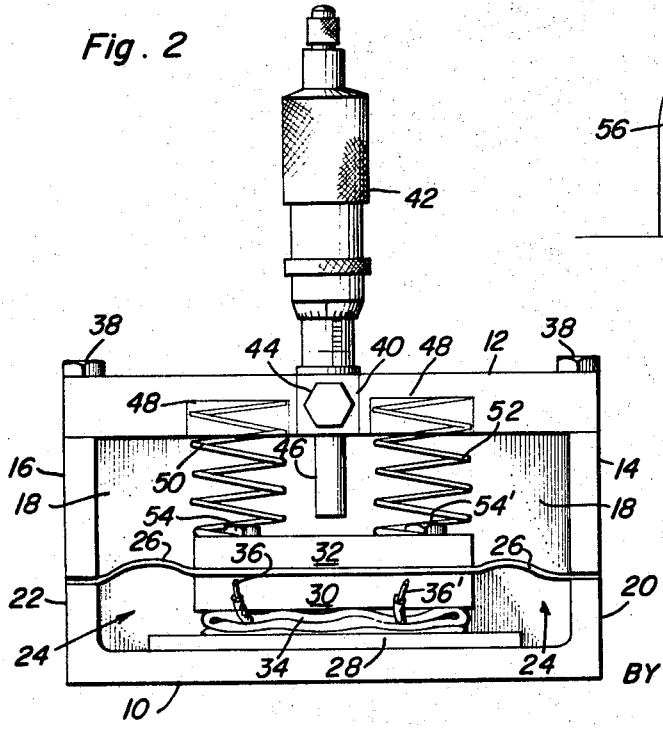
FIGURE 2 is a plan view of the assembly and clearly illustrating the use of the micrometer to accurately determine the electrode-membrane assembly expansion.

As shown in the FIGURES 1 and 2, the apparatus is comprised of an outer chamber which may be of methyl methacrylate and formed of a rear member 10, a front member 12, held in spatial relationship by a pair of side members 14 and 16. The members 10, 12, 14 and 16 form the sides of the chamber while a bottom member 18 closes the lower end of the chamber. The upper end of the chamber may be open as shown in the FIGURE 1.

The rear member 10 has a pair of perpendicular sections 20 and 22 which form an electrolytic compartment 24 when a flexible membrane 26 is inserted and secured between the rear member 10 and the side members 14 and 16. A base plate 28 is secured within the electrolytic compartment 24 to the inner wall of the rear member 10. In spatial relationship to the base plate 28 is a pressure plate formed of an inner pressure plate 30 and an outer pressure plate 32. The flexible membrane 26 separates the inner pressure plate 30 and the outer pressure plate 32. The flexible membrane 26, which may be of an elastomeric material such as neoprene, is slightly curved in the area external to the pressure plates 30 and 32 so as to not restrict the movement of the pressure plates 30 and 32. The base plate 28 and the inner pressure plate 30, as well as the outer pressure plate 32, are flat so as to form a measuring area therebetween.

With reference to the FIGURES 1 and 2, an electrode-membrane assembly 34 having a pair of electrical leads 36 and 36' is shown positioned between the base plate 28 and the inner pressure plate 30.

The front member 12 is tapped at a number of points about its outer edge so as to permit a plurality of bolts 38 to extend therethrough and the bolts 38 pass through the side members 14 and 16 and are threaded into the perpendicular sections 20 and 22 of the rear member 10. The bolts 38 retain the rear member 10, front member 12, side members 14 and 16, bottom member 18 and the flexible membrane 26 in the position shown and forming the chamber. The assembly may be secured in position by any number of bolts 38 and as illustrated, seven such bolts are shown.

The front member 12 has an aperture 40 centrally located thereon for receiving a micrometer 42 which is held in place by a threaded member 44 which is transversely tapped into the front member 12 and in engagement with the body of the micrometer 42. The micrometer 42 has a measuring probe 46 which extends into the chamber and by operation of the micrometer 42, may be caused to engage the outer pressure plate 32. The inner surface of the front member 12 is drilled at 48 and 48' (actually at four places but only two are shown in the FIGURE 2) so as to receive one end of a pair of coil springs 50 and 52. It will be understood that four such coil springs would be employed in the practice of the invention although one such spring, having a diameter larger than the diameter of the coil springs 50 and 52, may be successfully employed. A plurality of bolts 54 and 54' are employed to maintain the inner pressure plate 30 and the outer pressure plate 32 as a unitary member and the springs 50 and 52 may be secured to, if desired, the outer pressure plate 32 in any suitable manner.

Figure 3:
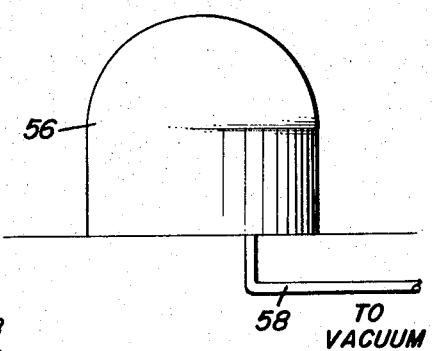
FIGURE 3 is a schematic showing of a device, such as a bell jar, for maintaining a vacuum to remove entrapped air after immersing the electrode-membrane assembly in the electrolyte.

The FIGURE 3 illustrates an apparatus, such as a bell jar 56 communicating with a vacuum line 58 which may be employed to release any entrapped gases after the electrode-membrane assembly is initally submerged in electrolyte.

*Operation*

To practice the invention and accurately determine the amount or rate of expansion of an object in the electrolytic compartment 24, a dry membrane-electrode assembly is positioned between the base plate 28 and the inner pressure plate 30. Four springs, such as the springs 50 and 52, of known spring constant are inserted, if not already in position, to provide a known force on the dry assembly. The depression of the springs can be measured to determine the force. The micrometer 42 is then inserted in the aperture 40 and secured in place by the threaded member 44. The micrometer 42 is then rotated until the measuring probe 46 engages the surface of the outer pressure plate 32. The reading of the micrometer 42 is then recorded. Thereafter, the micrometer 42 is reversely rotated so as to withdraw the measuring probe 46 from engagement with the outer pressure plate 32 and of a sufficient distance so that the subsequent expansion of the electrode-membrane assembly 34 will not engage the tip of the probe 46.

The electrolytic compartment 24 is now filled with a suitable electrolyte, such as a solution of potassium hydroxide. Care is exercised so that the electrode-membrane assembly 34 is completely immersed. The entire apparatus is then placed within the bell jar 56 and the system pumped down to approximately five inches of mercury absolute so as to remove any entrapped air from the electrode stack. After a suitable time in the vacuum chamber, the apparatus is removed so that periodic readings of the micrometer 42 can be made. It will be intuitively clear to those skilled in the art that if one wishes to make the reading while the assembly is under reduced pressure, provision would be made for the micrometer 42 to extend through the bell jar 56 so that the readings could be made at a reduced pressure.

Periodic readings are made with the micrometer 42 to determine the movement of the inner and outer pressure plates 30 and 32 caused by the expansion of the electrode-membrane assembly 34. At the same time, depression of the springs 50, 52, and the springs not shown can be measured from which the restricting force on the electrode stack 34 can be calculated. The flexible membrane 26 is slightly buckled in the area external to the inner and outer pressure plates 30 and 32 so as to avoid significant restraining forces on the expanding electrode-membrane assembly 34. When the reading of the micrometer 42 becomes constant, the expansion of the electrode-membrane assembly 34 is complete and the total expansion is the difference between the final constant reading and the initial 0 reading. The force exerted by the expanded electrode-membrane assembly 34 can be readily determined by the change in the length of the springs with the knowledge of the spring constant.

The invention provides a number of advantages over the methods of the prior art in that the device permits the measurement of a sample electrode assembly in that it gives the cell designer the actual total expansion of the electrode stack rather than the total expansion based on the measurement of one layer of membrane material. In the latter case, errors in the measurement of one film of thickness are accumulative when used as a basis for multi-layer separator design. In addition, the expansion contributions of the positive and/or negative electrodes which when wetted with the electrolytic solution can be determined simultaneously with the separator expansion measurements.

A salient feature of the invention is that the expansion of the entire electrode assembly can be measured in an environment that is operationally representative, i.e., as the material expands it does so under a gradually increasing restrictive force. This procedure simulates the expansion of the electrode stack against the cell case wall. The restrictive or compressive force on the electrode-separator assembly can have significant effect on over-all cell performance. The electrode-separator assembly expansion can readily be determined, by a number of successive readings, as a function of time. This data is important when specifying the minimum time between filling electrochemical cells with electrolyte and using the cells in practice.

In addition to the foregoing uses, a number of additional uses of the device are anticipated. In conventional cells wherein glycerine-free cellophane or modifications thereof are used as the primary separator system, it has been determined that approximately two pounds per square inch restricting force on the expanded electrode assembly is optimum for cell operation. However, in the development of new separator materials for alkaline cells, this force may not prove to be optimum for these materials. In the device described above and the subject matter of this invention, it is a relatively easy matter to vary the restricting force on an experimental separator assembly by obtaining springs with a range of spring constants or by varying the compression of the springs in any one assembly. Further uses of the invention are envisioned. Cell performance characteristics such as ampere hour capacity, voltage regulation and gas recombination can be dependent upon the restricting forces imposed upon the electrode assembly. The present invention, or modifications thereof, may be used to study the effects of the compressive forces in relation to the above performance characteristics.

The invention is extremely helpful to the cell case designer. In the evaluation of new electrode systems involving novel electrochemical couples and/or separators, the experimenter must also design and fabricate various size cases to contain experimental assemblies for study. The device can be used as a tool in such programs and allow the experimenter a wide variance in physical dimensions of his electrode-separator assembly while at the same time the compressive forces on the assembly can be maintained nearly constant.

Thus, there has been illustrated and described an apparatus for measuring the expansion of a membrane-electrode assembly in electrochemical cells which is a superior device for studying cell parameters. The present invention may be embodied in other specific forms without departing from the spirit and the essential characteristics of the invention. The present embodiment is, therefore, to be considered in all respects as illustrative and not the scope of the invention being indicated by the appended claims rather than the foregoing description, and all changes which come within the meaning and range of the equivalency of the claims are, therefore, intended to be embraced therein.

What is claimed is:

1. Apparatus for measuring the change in dimension of an object comprising a chamber having an open end, side members, front member, rear member, and bottom member; a flexible member connected to said side members and said bottom member and dividing said chamber into a first section and a second section, said first section containing said rear member, a base plate attached to said rear member and a portion of said side members and said bottom member, said second section containing said front member and the remainders of said side members and said bottom member; means coupled to said flexible member and positioned within said first section in spatial relation to said base plate and defining an object receiving area therebetween; and means partially external to said chamber and extending into said second section for measuring the excursion of said means coupled to said flexible member.

2. Apparatus for measuring the change in dimension of an object comprising a chamber having an open end, side members, front member, rear member, and bottom member; a flexible member connected to said side members and said bottom member and dividing said chamber into a first section and a second section, said first section containing said rear member, a base plate attached to said rear member, and a portion of said side members and said bottom member, said second section containing said front member and the remainders of said side members and said bottom member; means coupled to said flexible member and positioned within said first section in spatial relation to said base plate and defining an object receiving area therebetween; means for urging said means coupled to said flexible member toward said base plate; and means partially external to said chamber and extending into said second section for measuring the excursion of said means coupled to said flexible member.

3. The combination as defined in claim 2 wherein said means for urging are resilient means.

4. The combination as defined in claim 3 wherein said resilient means are a plurality of uniformly spaced springs engaging said means coupled to said flexible member and said front member.

5. The combination as defined in claim 1 wherein said flexible member is an elastomeric diaphragm.

6. Apparatus for measuring the change in dimension of an object comprising a chamber having an open end, side members, front member, rear member, and bottom member; an elastomeric diaphragm connected to said side members and said bottom member and dividing said chamber into a first section and a second section, said first section containing said rear member, a base plate attached to said rear member, and a portion of said side members and said bottom member, said second section containing said front member and the remainders of said side members and said bottom member; a pressure plate coupled to and bisected by said diaphragm so that portions of said pressure plate are disposed in each section of said chamber, said pressure plate being in spatial relation to said base plate and defining an object receiving area therebetween; spring means in said second section for urging said pressure plate toward said base plate; and means partially external to said chamber and extending into said second section for measuring the excursion of said pressure plate.

7. The combination as defined in claim 6 wherein said means for measuring is a micrometer.

8. Apparatus for measuring the swelling of an electrode assembly when subjected to an electrolyte comprising a chamber having an open end, side members, front member, rear member, and bottom member; a flexible member connected to said side members and said bottom member and dividing said chamber into a first section and a second section, said first section containing said rear member, a base plate attached to said rear member, and a portion of said side members and said bottom member, said second section containing said front member and the remainders of said side members and said bottom member; a pressure plate coupled to and bisected by said flexible member so that portions of said pressure plate are disposed in each of said sections of said chamber, said pressure plate being in spatial relation to said base plate and defining an electrode assembly area therebetween; an electrode assembly positioned within said area and in engagement with said base plate and said pressure plate; resilient means in said second section for engaging said pressure plate so as to apply a compressive force to said electrode assembly; and means partially external to said chamber and extending into said second section for measuring the swelling of said electrode assembly by determining the position of said pressure plate with respect to said base plate.

9. The combination as defined in claim 8 wherein said flexible member is an elastomeric diaphragm.

10. The combination as defined in claim 8 wherein said means for measuring is a micrometer.

11. The combination as defined in claim 8 wherein said resilient means are uniformly spaced coil springs.

References Cited

UNITED STATES PATENTS

| | | | |
|---|---|---|---|
| 1,184,837 | 5/1916 | Edgecomb | 73—16 |
| 2,177,399 | 10/1939 | Aller | 33—172 |
| 2,365,496 | 12/1944 | Shaw | 73—73 |
| 2,659,151 | 11/1953 | Lee | 33—125 |

SAMUEL S. MATTHEWS, *Primary Examiner.*

U.S. Cl. X.R.

73—73